Dec. 28, 1948.　　　D. R. BALLARD　　　2,457,432
POULTRY FEEDER
Filed Jan. 10, 1947
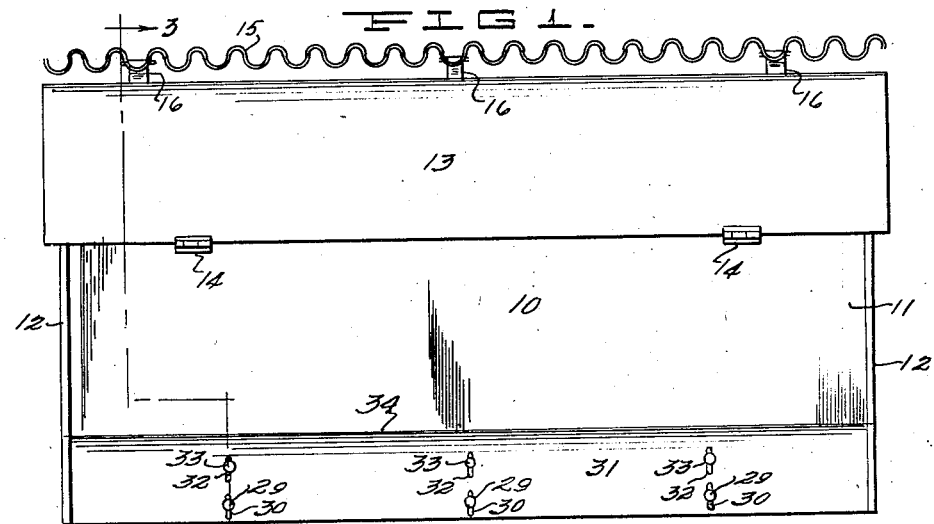
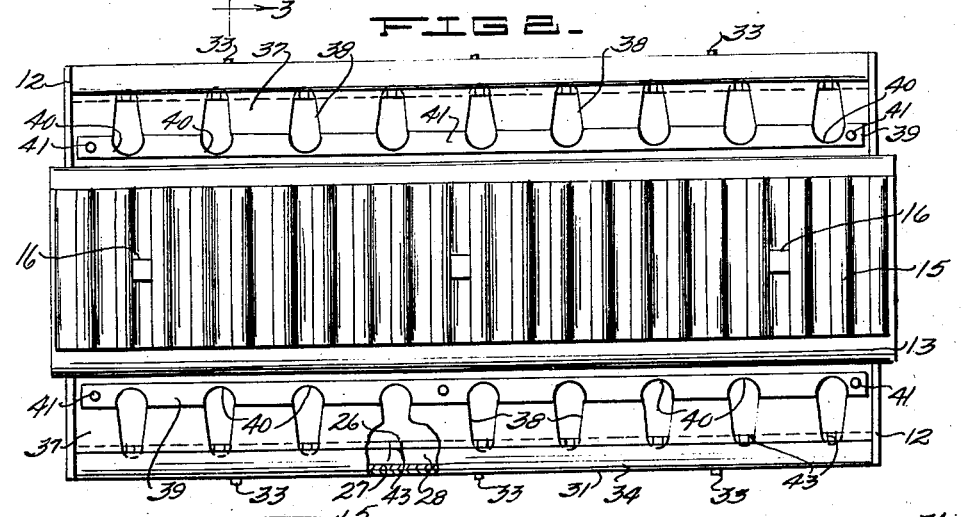
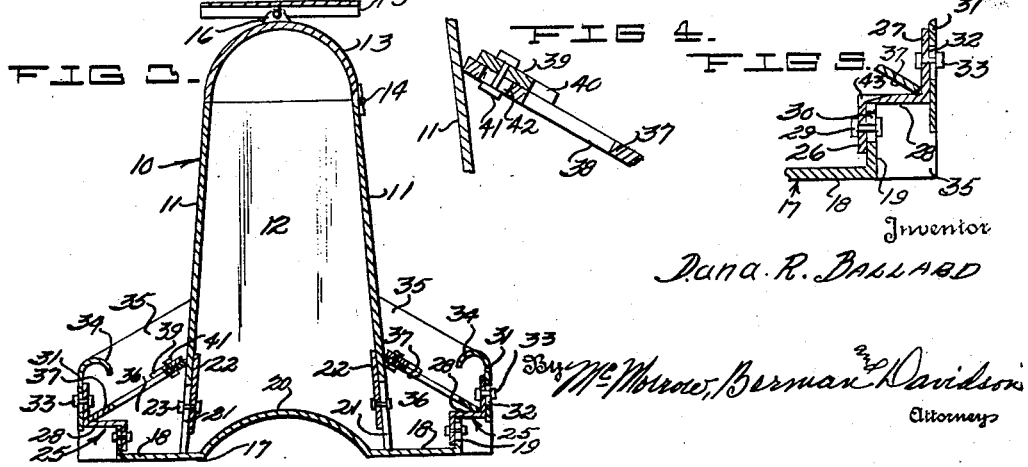
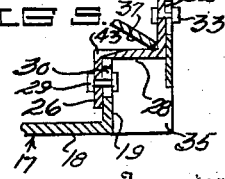
Inventor
Dana R. Ballard
By McMorrow, Berman & Davidson
Attorneys Patented Dec. 28, 1948

2,457,432

UNITED STATES PATENT OFFICE 2,457,432

POULTRY FEEDER

Dana R. Ballard, Madera, Calif.

Application January 10, 1947, Serial No. 721,245

3 Claims. (Cl. 119—53)

1

My invention relates to a poultry feeder.

An important object of my invention is to provide a poultry feeder adapted for the feeding of various sizes of poultry, and particularly adapted for feeding chickens.

A further object of the invention is to provide a poultry feeder, wherein the feed is automatically delivered, by gravity, into proper relation with the feed openings of the device.

A further object is to provide a poultry feeder constructed to prevent the loss of feed contained therein, either by the entry of foreign matter into the feeder, or by poultry tossing the feed from the feeder.

A still further object of my invention is to provide a poultry feeder having means for preventing the poultry from roosting on top of the feeder.

Other objects and advantages of the invention will be apparent during the course of the following description.

In the accompanying drawings, forming a part of this application, and in which like numerals are employed to designate like parts throughout the same, Figure 1 is a side elevation of the poultry feeder embodying my invention, Figure 2 is a plan view of the same, parts broken away, Figure 3 is a vertical transverse section taken on line 3—3 of Figure 1, Figure 4 is a fragmentary vertical sectional detail through a feeder plate and its associated adjustment shutter, drawn on an enlarged scale, Figure 5 is an enlarged fragmentary vertical section through a Z-shaped support, and associated elements.

In the drawings, where for the purpose of illustration is shown a preferred embodiment of my invention, the numeral 10 designates a feed hopper, which is open at its top, and which has generally vertical sides 11, and vertical ends 12, all rigidly secured together. The upper open end of the hopper 10 is provided with a hinged roof or cover 13, which is preferably semi-cylindrical. The roof or cover 13 is hinged to the upper end of the hopper, at one side of the same, by means of hinges 14. Mounted upon the roof or cover 13, and having pivotal connection therewith, is a transversely corrugated vane 15. This vane 15 is pivotally secured to longitudinally spaced upstanding lugs 16, carried by the cover 13, and the vane is free to pivot or tilt laterally with respect to the cover 13. The vane 15 is horizontal, and extends longitudinally of the cover 13 for the full length of the same.

2

Arranged beneath the hopper 10, and extending for the full length of the same, is a horizontal tray 17, which extends outwardly beyond the sides 11, as shown at 18, and carries longitudinal vertically upstanding side flanges 19. The tray 17 has a raised portion 20, extending throughout its entire length, and this raised portion is upwardly inclined from the bottom of the tray in transverse cross section.

The ends 12 are rigidly secured to the ends of the tray 17, while the lower edges of the sides 11 terminate short of the bottom of the tray 17, providing longitudinal openings 21 which extend throughout substantially the entire length of the hopper. Vertically adjustably mounted upon the inner surfaces of the sides 11, near the lower edges of the same, are longitudinal feed control plates or shutters 22, adapted for covering the longitudinal openings 21. These feed control plates are connected with bolts 23, extending through vertical slots formed in the sides 11. It is thus seen that by manipulation of the bolts 23, the feed control plates 22 may be vertically adjusted and clamped in the selected adjusted position.

Vertically adjustably mounted upon the upstanding flanges 19 are Z-shaped supports or strips 25, which extend for the full length of the hopper 10. These Z-shaped supports include lower and upper vertical webs 26 and 27, and a horizontal web 28. The vertical webs 26 carry bolts 29, extending through vertical slots 30 in the flanges 19. The numeral 31 designates longitudinal guards or baffles, having vertical slots 32, for receiving bolts 33 carried by the webs 27. The baffles 31 are vertically adjustable, and may be clamped in the selected adjusted position by the bolts 33. The baffles 31 extend for the entire length of the tray 17, and have their upper edges rolled to provide inwardly projecting curved flanges 34.

The ends 12 have wing portions 35, extending outwardly beyond the sides 11 of the hopper 10, with the tray 17 and associated elements, and form with the tray feed compartments 36. Removably mounted within the feed compartments 36 are feeder plates 37, having feed openings 38, for the passage of the heads of the poultry. These feeder plates 37 are vertically inclined, and their upper edges engaged against the sides 11, while their lower edges rest upon the horizontal webs 28. Slidably adjustably mounted upon the feeder plates 37, near the upper edges of the same are longitudinal slides or shutters 39. The shutters 39 have notches or recesses 40, formed in their lower edges, and these recesses register with the feed openings 38 in assembly. The shutters 39 carry bolts 41 extending through slots 42 in the feeder plates 37. The shutters 39 are therefore adjustable laterally upon the feeder plates to vary the size of the feed openings 38. Formed in the horizontal webs 28 of the Z-shaped supports 25, and arranged beneath each feed opening 38, are transverse inwardly downwardly inclined recesses or troughs 43. These troughs 43 extend inwardly to the edge of the horizontal web 28, and facilitate the return of the feed tossed up by the poultry to the feed compartments 36.

The operation of the poultry feeder is as follows:

The device may be placed on the ground, in a poultry building, or on any suitable stand, and the hopper 10 is filled with any suitable feed. The feed control plates 22 are previously adjusted and regulate the gravitational supply of feed from the hopper into the feed compartments 36. The raised inclined portion 20 of the tray 17 further aids the gravitational supply of feed into the compartments 36. The feed control plates 22 may be opened to a greater extent to supply a large amount of feed, such as when full grown chickens are feeding, or they may be opened to any desired degree to properly regulate the supply of feed to the poultry. Both the Z sections 25 and the baffles 31 are vertically adjustable, by means of the bolts 29 and 33 respectively. These members may be adjusted to heights to accommodate poultry of various sizes.

The feeding poultry extend their necks over the curved flanges 34, and their heads extend into the feed openings 38 where they may reach the supply of feed in the feed compartments 36. The feeder plates 37 prevent the poultry from stepping into the feed compartments 36, and prevent any large amount of foreign matter from entering the feeder. The adjustable shutters 39 may be arranged so that the feed openings 38 are just large enough for the heads of the poultry, and thus further tend to prevent foreign matter from entering the feed compartments. The curved flanges 34 tend to prevent the loss of feed tossed up by the poultry while they are feeding. These curved flanges also prevent damage to the necks or bodies of the feeding poultry. The inwardly downwardly inclined troughs 43, tend to cause whatever feed drops back through the feed openings 38 and upon the horizontal webs 28 to return into the compartments 36. The corrugated pivoted vane 15 prevents the poultry from roosting on top of the feeder, as they cannot maintain a footing on the vane. The cover 13 may of course be swung open for refilling the feeder, and for cleaning the interior of the same. The adjustments of the various elements of the feeder, above described, show that the device is adapted for feeding poultry whether the same be large or small.

It is to be understood that the form of my invention, herewith shown and described, is to be taken as a preferred example of the same, and that various changes in the shape, size, and arrangement of parts may be resorted to, without departing from the spirit of my invention or the scope of the subjoined claims.

Having thus described my invention, what I claim is:

1. A poultry feeder, comprising a hopper adapted for containing feed and including sides and ends having portions extending externally transversely of the hopper, a tray secured to the lower end of the hopper and including portions extending externally transversely of the hopper, vertically upstanding flanges carried by the outer edges of the tray, adjustable Z-shaped members attached to the upstanding flanges, adjustable guards attached to the Z-shaped members, feeder strips supported upon the Z-shaped members and the sides of the hopper, adjustable shutters mounted upon the feeder strips, both ends of said transverse tray portions, said Z-shaped members, said guards and said feeder strips being enclosed by the transversely extending portions of the ends of the hopper, and a cover for the hopper.

2. A poultry feeder, comprising a feed hopper, a tray arranged beneath the feed hopper and having a portion extending outside of the hopper, an adjustable shutter carried by the hopper for controlling the supply of feed from within the same onto the outside portion of the tray, adjustable means including a Z-shaped member and a curved guard attached to the tray, a feeder plate mounted upon the Z-shaped member and engaging the hopper, and a cover for the hopper.

3. A poultry feeder, comprising a feed hopper including sides, a tray secured to the lower end of the hopper and including portions extending laterally outwardly from the hopper and vertically upstanding flanges, adjustable shutters attached to the sides of the hopper for controlling the supply of feed from within the hopper onto the lateral portions of the tray, adjustable Z-shaped members attached to the upstanding flanges, adjustable guards attached to the Z-shaped members, and feeder strips removably supported upon the Z-shaped members and engaging the sides of the hopper.

DANA R. BALLARD.

REFERENCES CITED

The following references are of record in the file of this patent:

UNITED STATES PATENTS

| Number | Name | Date |
|---|---|---|
| 1,463,862 | Wolf | Aug. 7, 1923 |
| 2,325,976 | Phillips | Aug. 3, 1943 |